United States Patent [19]

Roberts et al.

[11] Patent Number: 4,923,151

[45] Date of Patent: May 8, 1990

[54] TETHER POWER GENERATOR FOR EARTH ORBITING SATELLITES

[75] Inventors: Thomas G. Roberts, Huntsville; Edward L. Wilkinson, New Hope; Lee O. Webster, Huntsville, all of Ala.

[73] Assignee: The United States of America as represented by the Secretary of the Army, Washington, D.C.

[21] Appl. No.: 162,721

[22] Filed: Mar. 1, 1988

[51] Int. Cl.$^5$ ............................................. B64G 1/20
[52] U.S. Cl. .................................. 244/158 R; 244/167
[58] Field of Search .................. 244/158 R, 164, 167, 244/172

[56] References Cited

U.S. PATENT DOCUMENTS

| | | | |
|---|---|---|---|
| 3,363,857 | 1/1968 | Vilbig | 244/158 R |
| 3,389,877 | 6/1968 | Huber et al. | 244/158 R |
| 4,097,010 | 6/1978 | Colombo et al. | 244/158 R |

FOREIGN PATENT DOCUMENTS

| | | | |
|---|---|---|---|
| 1317739 | 1/1963 | France | 244/158 R |
| 946372 | 1/1982 | U.S.S.R. | 244/158 R |

OTHER PUBLICATIONS

Tethers Open New Space Options, Ivan Bekey, NASA, Astronautics & Aeronautics, Apr. 1983.
Tethers in Space—Birth and Growth of a New Avenue to Space Utilization, by Georg von Tiesenhausen (NASA), Feb. 1984.
Martin Marietta Aerospace Final Study Report: Phase II Study of Selected Tether Applications in Space, Feb. 1985, pp. ii, iii, iv, 16, 18-36.
NAS, Inc., Report Entitled "Forces on an Electrodynamic Tether Power Generator Earth Orbiting Satellite", Jan. 8, 1986.

Primary Examiner—Sherman D. Basinger
Assistant Examiner—Stephen P. Avila
Attorney, Agent, or Firm—Freddie M. Bush; Hay Kyung Chang; James T. Deaton

[57] ABSTRACT

A power generation system utilizes an electromagnetic tether having a three conductor, coaxial configuration which allows the circuit to be closed internal to two orbiting objects. An outer cylinder of the tether is a conductor which is used to cut or pass through the earth's magnetic field to produce a voltage output. A cylinder within the outer cylinder is made of a metal such as soft iron and is used to shield a central conductor from the earth's magnetic field. The two outer cylinders are insulated from the center conductor except at one of the tethered objects where they are electrically connected. This causes the end of the center conductor to be at the same electrical potential as the tethered object when there is an infinite load. Useful power is produced at the other object, which may be a space ship, when a switch is closed and the potential is between the outer cylinder and the center conductor.

4 Claims, 1 Drawing Sheet

U.S. Patent     May 8, 1990     4,923,151
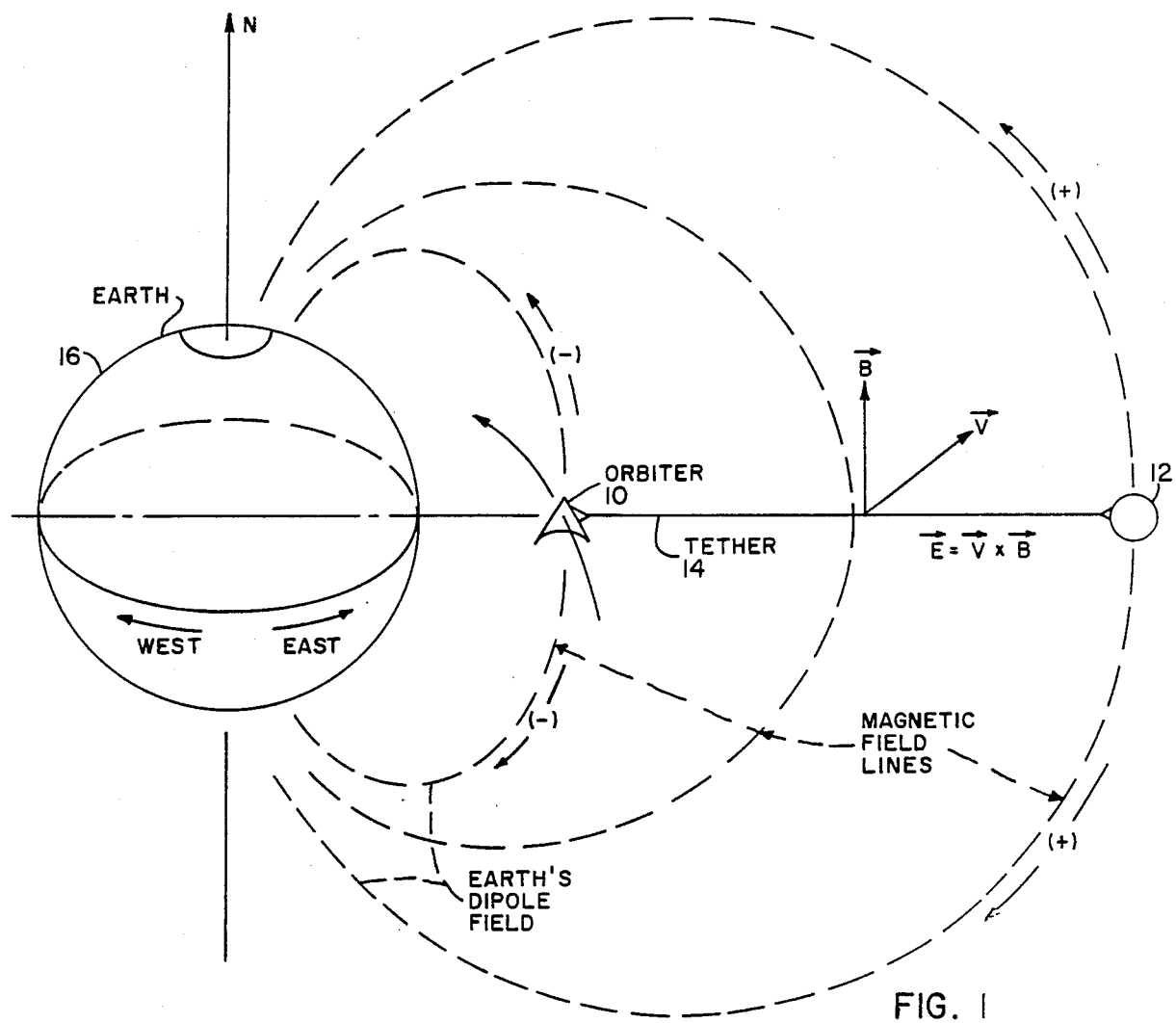
FIG. 1
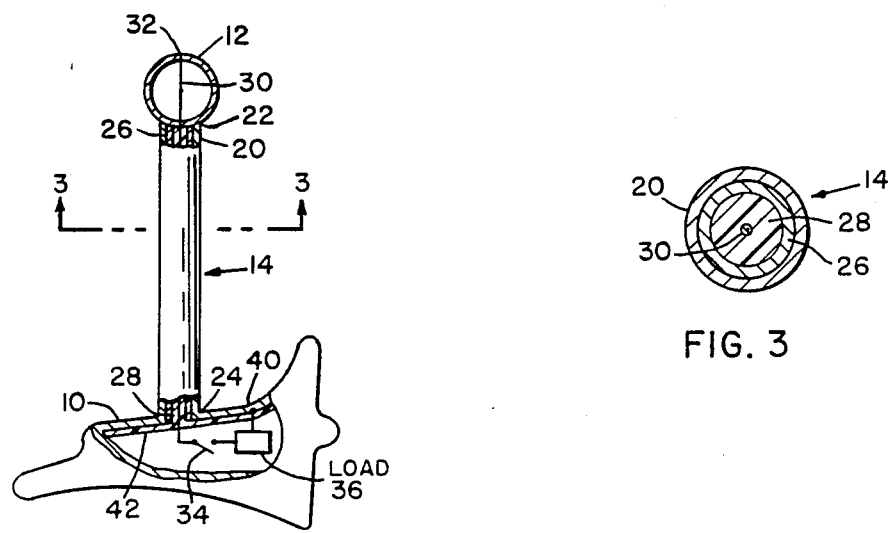
FIG. 2
FIG. 3 ers refer to like parts, FIG. 1 shows two objects 10 and 12

TETHER POWER GENERATOR FOR EARTH ORBITING SATELLITES

DEDICATORY CLAUSE

The invention described herein may be manufactured, used, and licensed by or for the Government for governmental purposes without the payment to us of any royalties thereon.

BACKGROUND OF THE INVENTION

The deployment of two or more spacecraft connected by variable length tethers makes possible many new options for space operation. One option is generation of electric power in space. Studies have shown that a tether towed through the charged plasma medium of space (ionosphere) to cut the geomagnetic field between two spacecraft in low orbits can provide an efficient source of electric power. In these studies, the spacecraft and tether act as a generator of very large dimensions with the current return path being through the plasma medium. These studies have shown that a 100 kilowatt (KW) power generator based on a 100 kilometer (km) electrodynamic tether can be both feasible and practical, using currently available technology.

In all of these considerations for power generation applications, the tether electric circuit is closed through the surrounding plasma medium (ionosphere), and the impedence depends on the actual condition of the plasma medium where the generator is operating. In some cases this could be favorable, for example, a 15 gauge wire with a resistance of 10 Ohms/km would allow a useable current of 10 amperes (A) to be drawn at a power level of 2.4 KW/km. The current limit depends specifically on the condition of the ionospheric plasma, the collection area that is in contact with this plasma, and the ability of the system to eject charges to the plasma environment. It is not subject to the day-night cycle limitations of solar cells. The collection area may be increased by the use of multiple tethers or an increased end body cross section for a single tether. However, to close the circuit path requires both the collection of electrons at the tethered satellite and also the emission of electrons from the base station or shuttle orbiter. The limitations on this process are yet to be determined, but to generate large currents will probably require the application of advanced cathode and electron acceleration technology. Thus, some basic research is necessary before the limits of current collection and emission mechanisms are established.

The generation of power also tends to cause an orbiter to lose altitude as kinetic energy is converted into electrical energy, and fuel is used by rockets to regain the orbiter altitude. That is, a tether generation system is reversible, kinetic energy of the orbital motion can be used to generate electrical energy or, in reverse, electrical energy can be used to increase the orbiter's altitude. The kinetic energy can be supplied either by the expenditure of chemical fuel, which would need to be resupplied, or by sufficient solar array power.

Tether power generation systems can provide a wide range of voltages and currents. For example, tethers of 200 km producing 200 amperes, for a power generation capability of 8 megawatts, or tethers as long as 500 km that may produce up to 20 megawatts are reasonable. To realize these potentials, however the current loop must not depend on the variable ionospheric plasma.

SUMMARY OF THE INVENTION

A tethered power generation system having an electromagnetic tether constructed having three conductors in a coaxial configuration which allows a current loop to be closed internal to two orbiting objects. The outer hollow cylindrical conductor is used to cut the earth's magnetic field to produce a voltage. A second cylinder beneath the first cylinder is made of a relatively soft magnetic material with high permeability such as iron and is used to shield a center conductor from the earth's magnetic field. These two outer cylinders are electrically insulated from the center conductor except at the tethered object at one end of the tether, where they are electrically connected. This causes the end of the center conductor to be at the same electrical potential as the tethered object when there is an infinite load (i.e., no current flow). However, useful power is produced at the spacecraft simply by closing a switch, thereby allowing the difference in potential which has been developed between the outer cylinder, which is part of the spacecraft, and the center conductor to appear accross the load.

BRIEF DESCRIPTION OF THE DRAWINGS

FIG. 1 is a simplified schematic diagram of two tethered objects in space and showing the magnetic and electric fields, motions, and forces of concern.

FIG. 2 is a simplified schematic of a tethered power generation system.

FIG. 3 is a simplified schematic of a cross section of the tether of FIG. 2 showing the essential construction features along the lines 3—3.

DESCRIPTION OF THE PREFERRED EMBODIMENT

Referring now to the drawings, wherein like numbers refer to like parts, FIG. 1 shows two objects 10 and 12 connected by a tether 14 which are revolving in orbit about the planet earth. As these two objects pass through the earth's dipole field, tether 14 cuts the magnetic field at a rate given by $V \times B$, where V is the velocity and B is strength of the earth's magnetic field. This creates an electric field ($E = V \times B$) which produces a force, $F = eE$ on the electrons in the conducting tether, where e is the charge on an electron and E is the electric field. This force on the electrons creates a charge separation which produces an electric potential due to Coulomb's law until the forces are balanced and current flow stops. When the forces are in balance, there is a potential difference (PD) between the tethered object 12 and the space station 10. The magnitude of this potential difference is given by $PD = (V_t \times B)l$, where $V_t$ is the orbit velocity of the tether, B is the magnetic field vector at the tether, and l is the tether's length vector.

As shown in FIGS. 2 and 3, tether 14 is constructed of four parts. An outer cylinder 20 which is a good conductor and is electrically connected at 22 to the outer surface of the tethered object 12 and electrically connected at 24 to the surface of space station 10 where the power is to be used. A conductive cylinder of soft magnetic material 26 which is just inside cylinder 20 is made of a high permeability metal (soft irons, etc.). The earth's magnetic field, after passing through conductor 20, flows through the soft magnetic material 26 and around the cylinder 28 and 30 rather than through them. Cylinder 28 is made of an electrical insulating material such as used in high voltage coaxial cables. This insulation 28 is used to electrically separate the outer two cylinders from conductor 30. The inner conductor 30 is also made of a good conducting material such as copper. One end of center conductor 30 projects through the center of tethered object 12 and is electrically connected to the outer conducting surface of the object at 32. The other end of conductor 30 is connected to one side of a switch 34 within space station 16. The switch 34 is connected to a load 36 for receiving an applied voltage and current from the tether when the switch is closed. Typically, load 36 may be any one or more of power conditioning networks, motors, instruments, weapons, and other on board devices that require power. The return path from load 36 is connected to the outer conducting body of the space station at multiple points such as point 40.

In operation, orbiting objects 10 and 12 revolve around the earth in their path and are separated from each other by approximately the length of the tether. The orbital path of rotation is such that tether 14 passes through or into the earth's magnetic field substantially normal to the magnetic field lines. A typical tether length is 20 km. With switch 34 open, so that no current can flow, outer cylinder 20 cuts the earth's magnetic field and produces a potential difference between objects 10 and 12. However, cylinder 28 shields the center conductor 30 and no current flow is produced. Therefore, since inner conductor 30 is connected to object 12, the conductor assumes the potential of object 12 and couples the entire potential difference across the open switch 34. The potential difference is the difference in potential at switch 34 between the end of the center conductor that is inside the space station at switch 34 and the outer conducting surface of the space station at 24 and 40. When the switch is closed the potential which has been developed is applied across the load, causing current to flow in the system. The complete circuit or current loop is from outer cylinder 20 through the connection of conductor 30 at point 32, through the switch, load, and outer surface of the space center or station 10, and back to conductor 20.

By closing the current loop internal to the system, plasma dependency is eliminated and the need for any of electron collection and emission mechanisms at the tether bodies is eliminated; i.e., the external circuit through the plasma is no longer necessary. The current is now a function of the length of the tether and the impedance per unit length of the conductors.

Cylinder 26 may be electrically connected to cylinder 20 or may be insulated from it. Insulation 28 may be of uniform thickness throughout its length; however, to minimize the weight in orbit, the insulating cylinder 28 may be very thin near object 12 where the potential between conductors 20 and 30 is small; however, it must be thick near object 10 where the potential between conductors 20 and 30 is large. Obviously, the inside surface of object 10 must be insulated 42 from the outside. More than one tether can be used. The conductors in the tether can also be cooled for high power operation. Typically, liquid hydrogen can be used for cooling and the resultant gaseous hydrogen that is produced can be used in either fuel cells or propulsion devices to restore the kinetic energy lost in producing electric energy by the tethered power system.

Although a particular embodiment and form of the invention has been shown and described, it is apparent that various modifications of the invention may be made by those skilled in the art without departing from the scope and spirit of the foregoing disclosure. For example, an outer insulation coating or cylinder may be used to separate the tether from any surrounding plasma medium; also an insulation cylinder can be used between the outer conducting cylinder and the cylinder made of soft magnetic material. Therefore, the scope of the invention should be limited only by the claims appended hereto.

We claim:

1. An electrical power generator for earth orbiting satellites, comprising: an earth orbiting object having an electrically conductive external surface region; electrically responsive load means within said object; a hollow, spherical, electrical conducting ball having an opening at one end thereof, electrically conductive means for passing through the planet earth's magnetic field to produce a voltage, said conductive means having respective first and second terminal ends, said first end being coupled to said orbiting object and to said load means, and said second end being coupled to said conducting ball for maintaining said ball and object in spaced apart relationship while simultaneously providing completely self-contained electrical circuit paths between said ball, orbiting object, and load means.

2. An electrical power generator as set forth in claim 1 wherein said electrically conductive means is a tether said tether being conductively anchored at said first end to said electrically conductive external surface region and being conductively anchored at the second end to the periphery of the opening in said ball.

3. An electrical power generator for earth orbiting satellites, comprising: an earth orbiting object having an electrically conductive external surface; electrically responsive load means located within said object; a hollow, spherical electrically conducting ball having an opening at one end thereof, an electrically conductive tether for passing through the planet earth's magnetic field to produce a voltage, said tether having first and second terminal ends, said first end being conductively coupled to said electrically conductive external surface of said orbiting object and to said load means and said second end being conductively coupled to the periphery of said opening in said conducting ball for maintaining said ball and object in spaced-apart relationship while simultaneously providing electrical circuit paths between said ball, orbiting object and load means, said tether further comprising first, second and third electrical conductors having a common longitudinal axis, said first conductor being an outer cylindrical sheath terminated at the first end to said orbiting object's conductive surface and terminated at the other end to the periphery of said opening into the sphere, said second conductor being a cylindrical sheath within and adjacent to said outer sheath and having respective first and second ends joined to the respective first and second ends of the first conductor, said second conductor providing a flow path for magnetic flux around said third conductor, and said third conductor being a solid conductor within said second sheath, said third conductor having a first end coupled through said orbiting object's external surface and connected to said load means and a second end coupled through the opening in said spherical ball and electrically connected to the opposite surface of the ball.

4. An electrical power generator for earth orbiting satellites, comprising: an earth orbiting object having an electrically conductive external surface; electrically responsive load means located within said object; a hollow, spherical, electrically conducting ball having an opening at one end thereof, an electrically conductive tether for passing through the planet earth's magnetic field to produce a voltage, said tether having first and second terminal ends, said first end being conductively coupled to said electrically conductive external surface of said orbiting object and to said load means and said second end being conductively coupled to the periphery of said opening in said conducting ball for maintaining said ball and object in spaced-apart relationship while simultaneously providing electrical circuit paths between said ball, orbiting object and load means, said tether further comprising first, second, and third electrical conductors having a common longitudinal axis, said first conductor being an outer cylindrical sheath terminated at the first end to said orbiting object's conductive surface and terminated at the other end to the periphery of said opening into the sphere, said second conductor being a cylindrical sheath within and adjacent to said outer sheath and having respective first and second ends joined to the respective first and second ends of the first conductor, said second conductor providing a flow path for magnetic flux around said third conductor, and said third conductor being a solid conductor within said second sheath, said third conductor having a first end coupled through said orbiting object's external surface and connected to said load means and a second end coupled through the opening in said spherical ball and electrically connected to the opposite surface of the ball; and said second conductor is made of a high permeability metal for interrupting magnetic lines of force and thereby shielding the center conductor from the earth's magnetic field, and further comprising insulation encompassing said third conductor for preventing electrical contact between said third conductor and said second conductor along the length of the tether.

* * * * *